T. W. EATON.
Machine for Manufacturing Barbed Fence Wire.
No. 227,968. Patented May 25, 1880.
4 Sheets—Sheet 1.
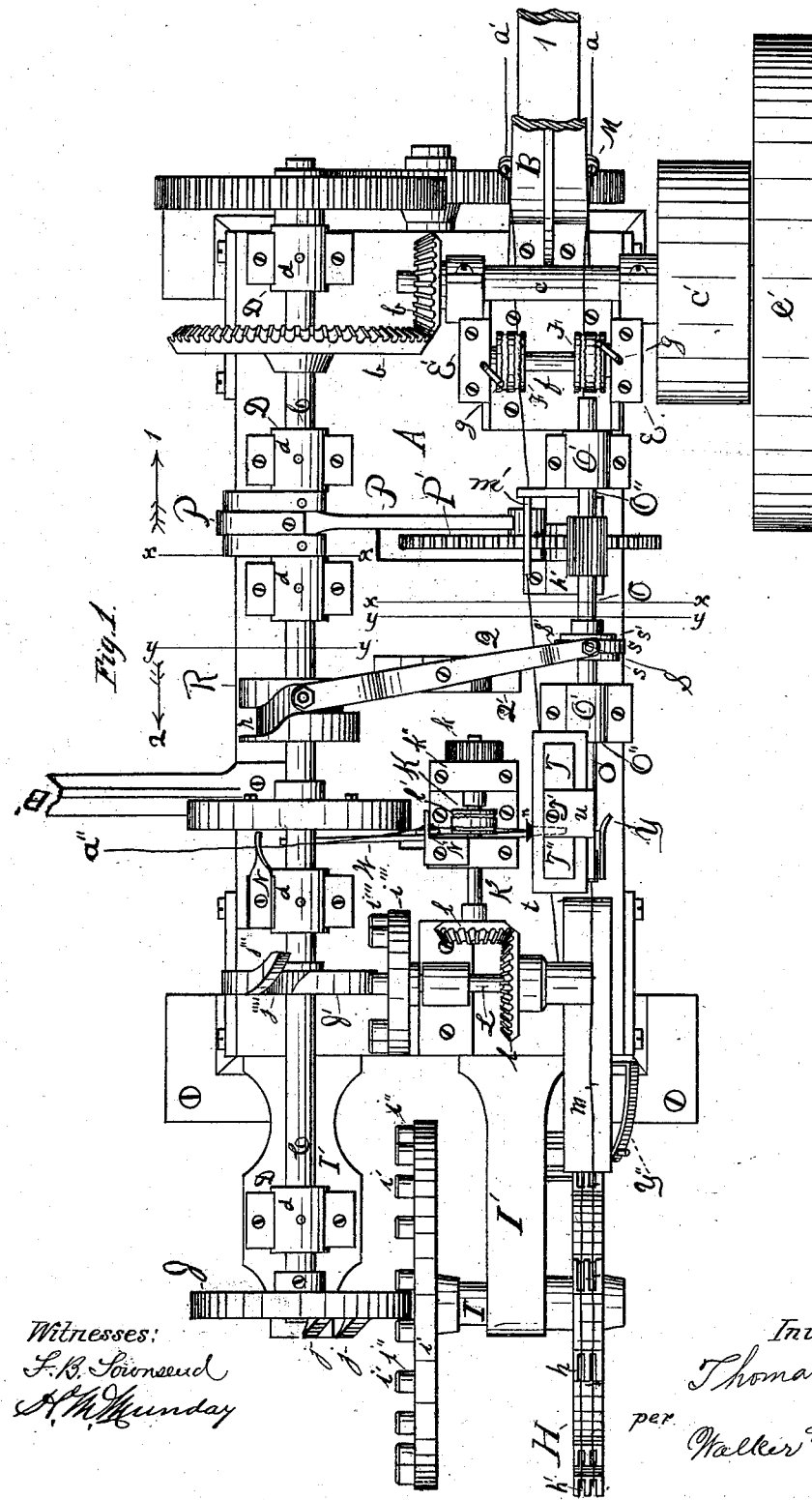
Witnesses:
F. B. Townsend
A. W. Munday
Inventor:
Thomas W. Eaton
per Walker and Adcock
Attorney

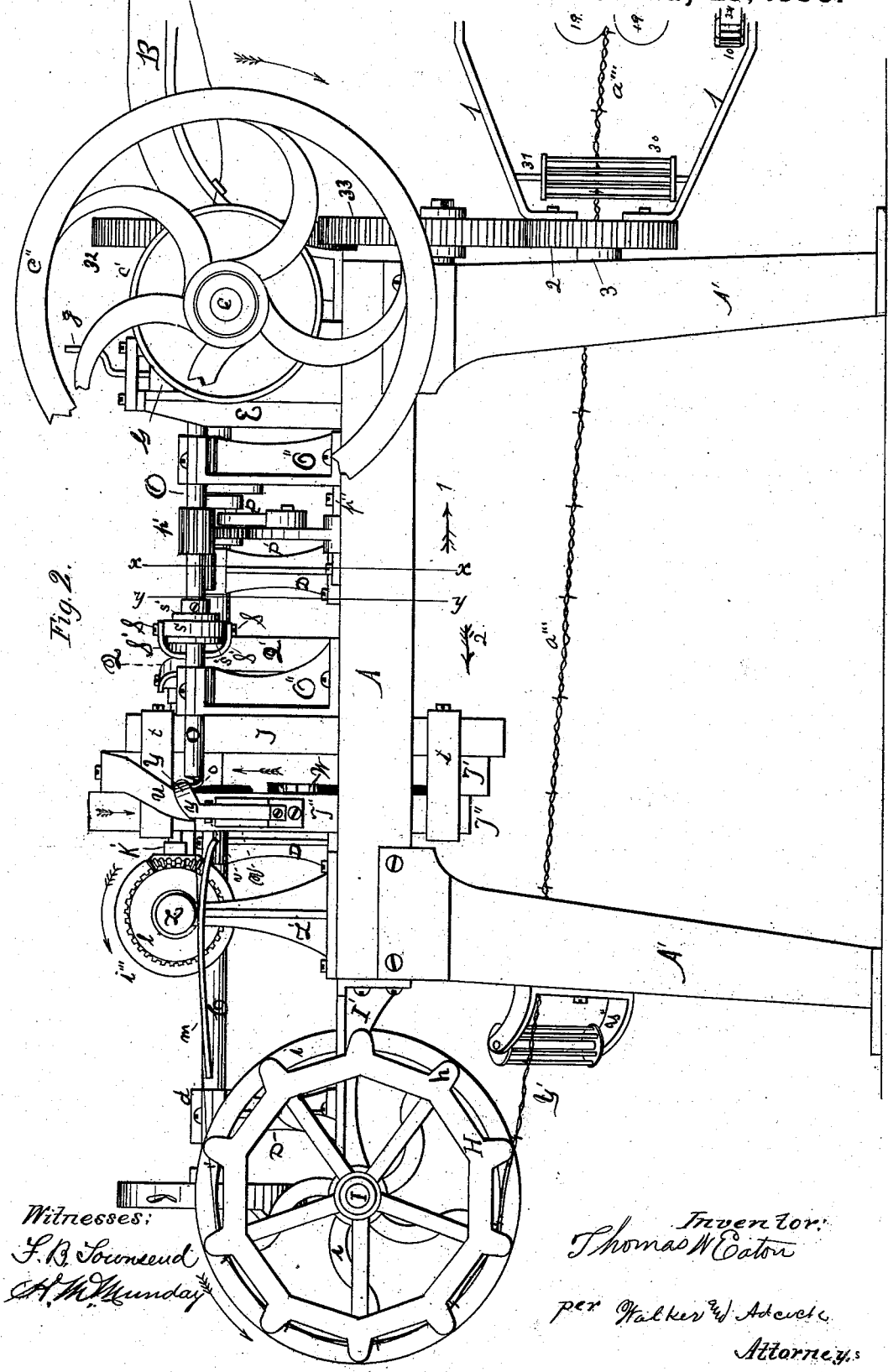

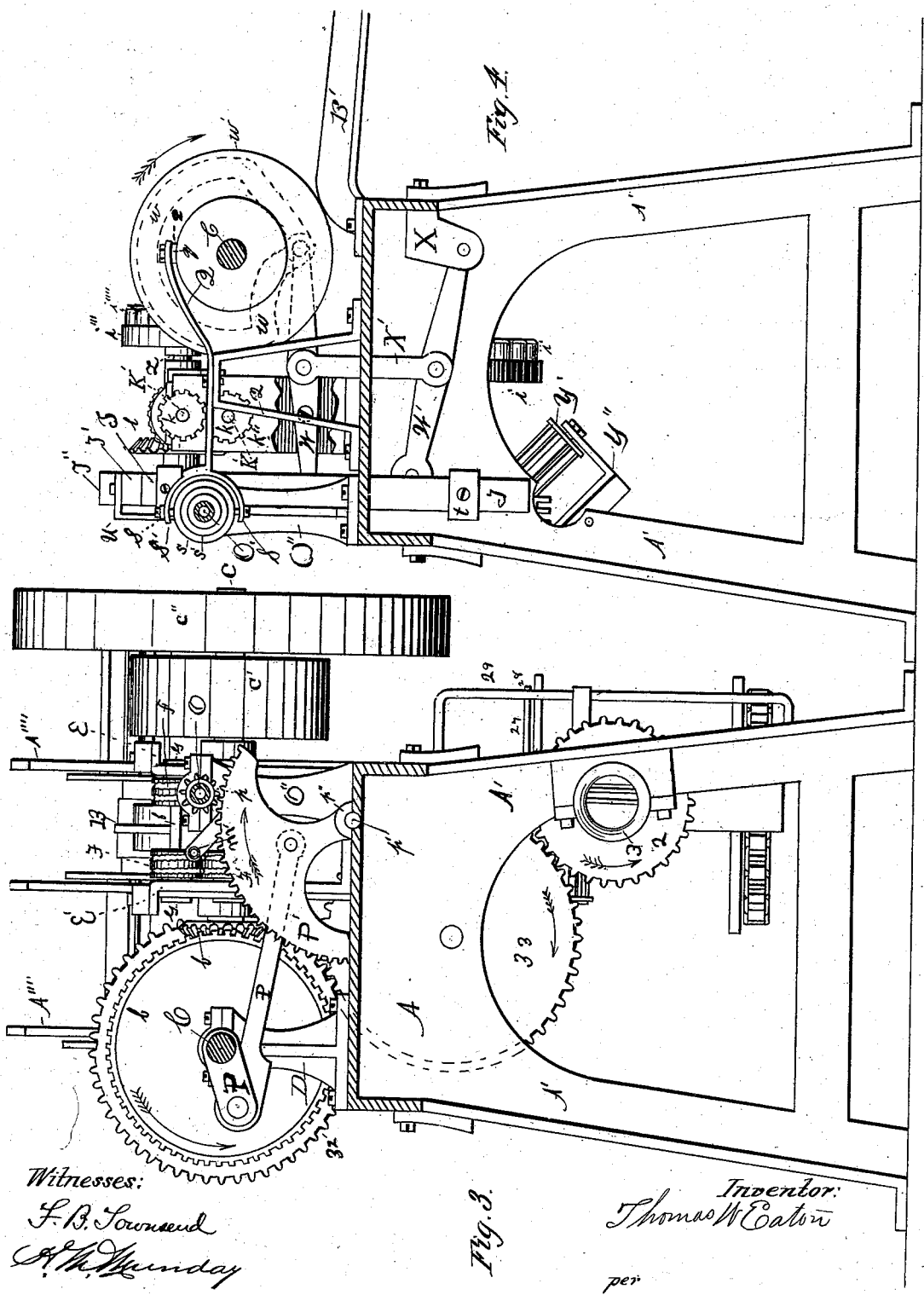

4 Sheets—Sheet 4.
T. W. EATON.
Machine for Manufacturing Barbed Fence Wire.
No. 227,968. Patented May 25, 1880.
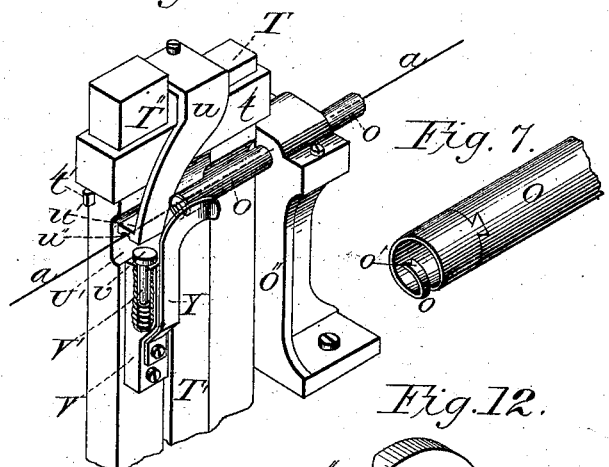
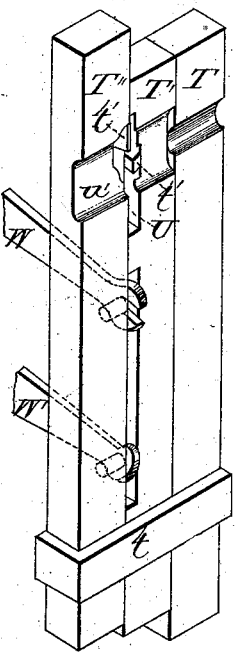
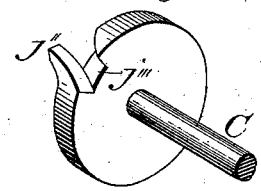
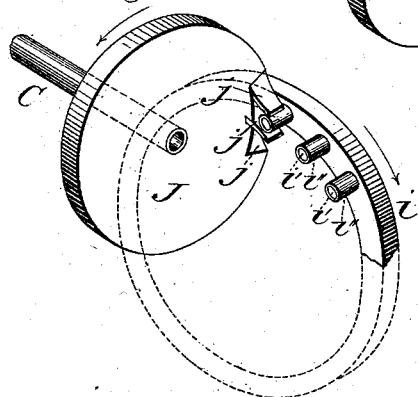
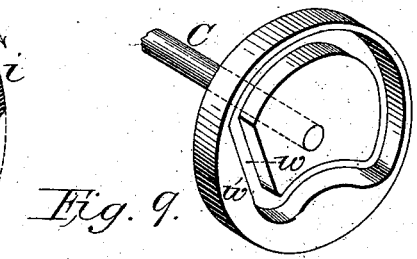
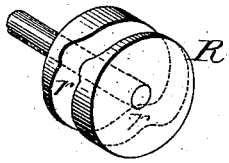
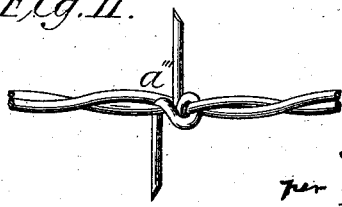
Witnesses.
H. W. Munday
Edw. S. Evarts
Inventor
Thomas W. Eaton
per Walker and Adcock
Attorneys
N. PETERS, PHOTO-LITHOGRAPHER, WASHINGTON, D. C.

UNITED STATES PATENT OFFICE.

THOMAS W. EATON, OF CHICAGO, ILLINOIS.

MACHINE FOR MANUFACTURING BARBED FENCE-WIRE.

SPECIFICATION forming part of Letters Patent No. 227,968, dated May 25, 1880.

Application filed June 19, 1879.

*To all whom it may concern:*

Be it known that I, THOMAS W. EATON, of Chicago, in the county of Cook and State of Illinois, have invented certain new and useful Improvements in Machines for Manufacturing Barbed Fence-Wire or Fencing, of which the following is a specification, reference being had to the accompanying drawings, forming a part hereof.
The object of my invention is to provide a machine for automatically manufacturing barbed fence-wire, and it is specially designed to make that kind of barbed fence-wire commonly known as the "Beers barbed fence-wire," which consists in the barb being wrapped two times around one of the two fence-wires, in the manner hereinafter to be shown, and then the two fence-wires twisted together into a cable; but my machine can be readily adapted to manufacture other kinds or varieties of barbed fence-wire.

My invention consists in the arrangement and combination of the several devices for feeding the fence-wires and the barb-wire at intervals, wrapping the barb-wire around the fence-wire, cutting off and pointing the barb, in connection with mechanism whereby motion is imparted to each of said devices or parts of the machine directly from one continuous shaft, thereby securing perfect consecution and synchronism in the motion of all the different devices or parts of the machine and regularity in their action.

It also consists in the particular form and construction of the different devices of the machine and the mechanism for actuating the same.

In the accompanying drawings, in which similar letters of reference indicate like parts, Figure 1 is a plan view of the machine embodying my invention, with the exception of the device for twisting and spooling. Fig. 2 is a side view of the same. Fig. 3 is a central vertical transverse section taken on line $xx, xx$, looking in the direction indicated by arrow 1. Fig. 4 is a similar view taken on line $yy$, $yy$, and looking in the opposite direction, indicated by arrow 2. Fig. 5 is a detail perspective view, somewhat enlarged, of the cutter-bars, guides, barbing-hook, and adjacent parts. Fig. 6 is a perspective view of the cutters with the barbing-shaft, part $u$, and guide Y removed. Fig. 7 is a detail view of barbing-hook and end of barbing-shaft. Figs. 8, 9, 10, and 12 are detail views of certain cams and parts hereinafter described, and Fig. 11 is a view of the completed fence-wire.

A is the frame or table of the machine, resting upon four legs, A', the feet of which are secured firmly to the floor by bolts or otherwise. $a$ and $a'$ are the fence-wires, which are to be twisted together to form the cable $a'''$ after the barbs have been fixed upon one of them, and $a''$ is the barb-wire or wire from which the barbs are to be cut.

B is an arm or support extending from and secured to the frame A, which supports two reels or spools, A''' A''', (not shown,) one for each of the wires $a$ and $a'$; and B' is a like arm secured to the frame A, supporting a similar spool for the barb-wire $a''$.

C is a long shaft, from which all the different devices of the machine receive their motion, and is suitably journaled in boxes or bearings $d$ on the standards D. The shaft C is connected, by means of the bevel-gear $bb$, with the shaft $c$, upon which the band-wheel $c'$ and the fly-wheel $c''$ are keyed, and which is journaled in suitable boxes or bearings secured to the side of the slotted standards E and E'.

F F and F' F' are two pairs of guide-rolls, each of which is provided with roughened grooves for the wires $a$ and $a'$. The shafts $f$ and $f'$ of the rolls F F and F' F' are journaled in bearings G G, which rest in slots $ee'$ in the standards E E'. The upper and lower pairs of these bearings are held apart by means of a spring, and the upper pair is capable of adjustment vertically by means of the adjusting-screws $g$, whereby the pressure of the guide-rolls F F and F' F' upon the wires $a$ and $a'$ can be regulated.

H is a polygon-shaped feed-wheel on the shaft I, provided with a series of lugs or projections, $h$, on its circumference, in each of which there are two notches, $h'$ $h'$, one for each of the fence-wires $a$ and $a'$. The lugs $h$ are placed the same distance apart on the circumference of the feed-wheel H that it is desired to place the barbs apart on the wire $a$. The shaft I is suitably journaled in boxes or bearings on the braces or arms I', which are secured to the back end of the frame A. $i$ is a wheel keyed to the shaft I, provided on one side, near its circumference, with a series of pins, $i'$, having friction-rollers or washers $i''$ thereon.

J is a wheel keyed on the end of the main shaft C, provided on one side, near its circumference, with cams or projections $jj$ and grooves $j'j'$, cut diagonally across its periphery. The thickness of the wheel J corresponds to the distance between the pins $i'i'$, and the width of the grooves $j'j'$ to the diameter of the pins $i'i'$, including their washers $i''i''$.

On the revolution of the wheel J the cam $j$ comes in contact with one of the pins $i'$, causing the wheel $i$ to turn. The next pin $i'$ in the series, striking into the groove $j'$, causes the wheel $i$ to continue its revolution as the pin $i'$ moves along the groove $j'$ across the periphery of the wheel J, and the next succeeding pin $i'$ strikes into the other groove $j'$ in like manner.

The form and arrangement of the cams $jj$ and grooves $j'j'$, in connection with the pins $i'i'$ on the wheel $i$, are such that at each revolution of shaft C the feed-wheel H is made to turn that part of a revolution indicated by the number of notched lugs $h$ upon its circumference, thus feeding or drawing forward the fence-wires $a$ and $a'$ each time just the distance the barbs are to be placed apart on the wire $a$, and, by reason of the wheel J being made of the same thickness as the distance between the pins $i'i'$, the feed-wheel H is held locked firm and stationary during all the revolution of the wheel J, except that part when the cams $jj$ and grooves $j'j'$ are passing the pins $i'i'$.

K K are the feed-rolls for the barb-wire $a''$, keyed to the shafts K' K', which are provided with cog-gear $kk$, meshing with each other.

The shafts K' K' are journaled in boxes or bearings K'' K'', resting in slots $k'k'$ in the standards $k''k''$. The lower pair of bearings rests upon springs, and the upper pair is secured to the top of the standards $k''k''$.

The upper shaft, K', is connected by means of the bevel cog-gear $ll$ with the shaft L, which is journaled in suitable boxes or bearings on the standards L' and L''. The shaft L is made to turn intermittently or at intervals, in the same manner as the shaft I, already described, and by similar mechanism, consisting of the wheel J', with cam $j'''$ and groove $j''''$, keyed to the shaft C, and the wheel $i'''$, with pins $i''''$, keyed to the shaft L. By this mechanism the feed-rolls K K are caused to turn sufficiently at each revolution of the shaft C to feed or draw forward the barb-wire $a''$ just such length as is required to form one barb, and during the process of barbing and cutting off the barb the barb-wire $a''$ is thereby also held firm and stationary. The feed-rolls K K are provided with one or more corrugated or roughened grooves for the barb-wire $a''$, for the purpose of guiding the same, holding it firmly, and preventing its slipping when being fed forward by the rolls K K and during the process of wrapping the barb around the wire $a'$, thus securing entire uniformity in the length of the barbs.

The wire $a$, upon which the barbs are to be fixed, passes from its spool through a guide-hole in the ear M on the arm B, between the guide-rolls F F, through the hollow shaft O, over the flat guide or support $m$, around the feed-wheel H in one set of the notches $h'$ in the lugs $h$, and thence to the twisting and spooling portion of the machine.

The flat guide $m$ is fixed to the standard L'. The other fence-wire, $a'$, passes from its spool through a guide-hole in the ear M', between the guide-rolls F' F', through the tubular guide $m'$, which is attached to the standard O'', and thence, around the feed-wheel H in the other set of notches $h'$ in the lugs $h$, to the twisting and spooling apparatus.

The barb-wire $a''$ passes from its spool through a hole or opening in the guide-piece N, attached to the standard D, through a like hole in like guide-piece N', attached to standard $k''$, between the feed-rolls K K, through the conical-shaped guide or eye $n$, and thence between the bars T' T'', which carry the cutters or knives for cutting off the barbs, the end of the barb-wire $a''$ projecting through beyond the fence-wire $a$ and immediately beneath it.

O is a hollow shaft, suitably journaled in boxes or bearings O' on the standards O'' in such manner as to admit of a slight reciprocating or sliding motion backward and forth in the direction of its length. The hollow shaft O extends from near the guide-rolls F F to near the projecting end of the barb-wire $a''$. $o$ is the barbing-hook, which is provided with a notch, $o'$, in its end. The hook $o$ is made of steel, and is of a spiral form, as if it were a continuation of a thread or spiral on the hollow shaft O, and is secured in a mortise cut in the end of the hollow shaft O by means of a key, so that it can be easily removed and replaced in case it should be broken or the jaws of the notch $o'$ become worn. Upon the revolution of the hollow shaft O, through which the fence-wire $a$ passes, the barbing-hook $o$ catches the projecting end of the barb-wire $a''$ in the jaws of the notch $o'$ and wraps or carries the same around the fence-wire $a$.

The hollow shaft O has two motions imparted to it—one a rotary motion and the other a reciprocating motion. Its rotary motion is first in one direction to wrap the barb-wire $a''$ around the fence-wire $a$, and next, in the reverse or opposite direction, for the purpose of extricating or clearing the barbing-hook $o$ from the formed barb. Its reciprocating or sliding motion is for the purpose of guiding the barbing-hook $o$ up under the projecting end of the barb-wire $a''$, so as to catch the same in the notch $o'$, and for the purpose of guiding the hook $o$ and the end of the barb-wire $a''$ with it down on one side of the barb-wire $a''$ at the first revolution of the hook $o$, and down on the opposite side of the barb-wire $a''$ at the next revolution of the hook $o$, thus wrapping the barb-wire $a''$ around the fence-wire $a$ in the manner shown in Fig. 13, and also for the purpose of extricating the barbing-hook $o$ from the completed barb and withdrawing the end of the hollow shaft O and the hook $o$ from in front of the barb-wire $a''$, so as to be out of the way of the same when the same is again fed forward to form the next barb.

Its rotary motion, as described, is imparted to the hollow shaft O from the main shaft C by means of the crank P P thereon, which actuates the segment P′, the cogs of which mesh with a pinion or cog gearing, $p$, keyed upon the hollow shaft O. The shaft $p'$ of the segment P′ is suitably journaled in boxes or bearings $p''$, secured to the frame A. The pinion $p$ is made of sufficient length to permit of the reciprocating motion of the hollow shaft O without the cogs of the same becoming disengaged with the cogs of the segment P′. When the crank P P pushes the segment P′ the hollow shaft O is caused to revolve in the direction necessary to wrap the barb-wire $a''$ around the fence-wire $a$, and when the segment P′ is pulled by the crank P P the hollow shaft O is caused to revolve in the reverse direction.

Its reciprocating motion, as described, is imparted to the hollow shaft O from the main shaft C by means of the lever Q, which is pivoted to the top of the standard or support Q′ as its fulcrum. One end of the lever Q is provided with a pin, $q$, having a washer or friction-roller, $q'$, thereon. The pin $q$ fits and works in a cam or groove, $r$, cut in the cylindrical surface of the cylinder R, which is keyed to the shaft C, and the other end of the lever Q is connected, by means of set-screws S S in jaws S′ S′, with a collar, $s$, on the hollow shaft O. The shoulders $s'$ $s'$ of the collar $s$ are provided with a thread, which works in corresponding thread on the hollow shaft O for the purpose of adjusting the position of the collar $s$ on the same.

The form of the groove or cam $r$ is more fully shown in Fig. 9, and is such as to give, by means of the lever Q, the required reciprocal motion already described to the hollow shaft O.

By varying the form of the cam $r$ the notched barbing-hook $o$ may be given any desired transverse or reciprocal motion, so as to wrap the barb-wire around the fence-wire or fence-wires in any desired manner, and by changing the relative proportions of the pinion $p$ and segment P′ any desired number of wraps may be given the barb-wire $a''$ around the fence-wire.

By reason of the barbing-hook $o$ being made of a spiral form it is specially adapted to make those kinds of barbs wherein the end of the barb-wire $a''$ is crossed in the course of the wrap from one side of the barb-wire $a''$ to the other, it not being possible to effect this crossing of the barb-wire by means of the ordinary barbing pin or plug secured in the end of a hollow barbing pinion or shaft; and in order to clear the barbing-hook $o$ from the completed barb it is necessary that the hollow shaft O have a reverse rotary motion at the same time it is drawn back by action of the lever Q.

T is an upright bar, fixed firmly to frame A and standard O″. T′ and T″ are similar bars, which work up and down in opposite directions in the boxes or guides $t$ $t$, which are secured firmly to the fixed bar T. The bar T′ is provided with a long notch or detent, U, in its face or side, which faces the bar T″, to permit the barb-wire $a''$ to pass between the two and to give room for the end of the barb-wire $a''$ when the same is being wrapped around the fence-wire $a$, and also to permit of the free motion of the bars T′ and T″ without interfering with the barb-wire $a''$. This detent or opening U might be cut in the other bar, T″, or partially in each of the two bars T′ T″; and the outer side or face of both bars T′ and T″ are scalloped out or provided with detents U′, to give room for the free passage of the completed barb when the fence-wire $a$ is again fed forward for the next barb.

Each of the bars T′ and T″ carry a cutter or knife, $t'$ $t'$, for cutting off the barb-wire $a''$. The cutters $t'$ $t'$ are fitted in mortises, which pass diagonally through the bars T T, and their faces or cutting-edges are so arranged as to cut the barb-wire $a''$ diagonally, thereby pointing the barb at the same time it is severed. The cutters $t'$ $t'$ are keyed in their mortises in such way as to be readily taken out and sharpened.

$n$ is a conical-shaped guide or eye for the barb-wire $a''$, the point of which extends into the detent U between the bars T′ and T″, close up to the cutters $t'$ $t'$, for the purpose of holding the barb-wire firm and fixed laterally and vertically during the process of wrapping the end of the same around the fence-wire $a$ and cutting off the barb. The guide $n$ is secured to brace or arm $n'$, fixed to the box or guide $t$, and is made of steel.

$u$ is an arm attached firmly, by means of a screw or in any suitable manner, to the top of the bar T′, having a flat foot, $w'$, provided with a guide-groove, $u''$, for the fence-wire $a$; and V is a lug or projection secured firmly to the bar T″, and a pin, V′, having a broad flat round head, $v$, rests upon a spring in a hole in this lug or projection V. By motion of the bars T′ and T″ the foot $u'$ of the arm $u$ and the head $v$ of the pin V′ are pressed together, holding the fence-wire $a$ between them in the groove $u''$ firm and steady from the time when the operation of wrapping the barb-wire $a''$ around the fence-wire $a$ is begun until it is finished. The arm $u$ and the pin V′ are arranged relatively to each other on the bars T and T, respectively, so that when the bars T′ and T″ are moved in opposite directions to press the foot $w'$ and head $v$ together the bar T''' is raised and the bar T' is lowered sufficiently, so that both the cutters $t'$ $t'$ are out of the way of the end of the barb-wire $a''$ when the same is being wrapped around the fence-wire $a$; and thus, by having both the bars T' and T''' movable, both the cutters $t'$ and $t'$ are out of the way, so that the end of the barb-wire $a''$ may be brought down at one revolution on one side of the barb-wire $a''$, or next to the bar T, and at the next revolution crossed over down on the opposite side of the barb-wire $a''$, or next to the other bar T.

After the operation of wrapping the barb-wire around the fence-wire is completed, the bars T' and T''' are again caused to move in opposite directions, causing the cutters $t'$ $t'$ to cut the barb from the barb-wire $a''$.

The motions that the bars T' and T''' have, as described, are communicated to them from the main shaft C by means of the levers W and W'. The lever W is pivoted to the standard $k'''$ as its fulcrum, and one end is pivoted to the bar T''', which it actuates, and its outer end is provided with a pin or follower, $w$, which works in a groove or cam, $w'$, cut in the side of the wheel $w''$, which is keyed to the shaft C. The lever W' is pivoted at its outer end to the lug or ear X on the frame A as its fulcrum, and its other end is pivoted to the bar T, which it actuates, and near its middle it is connected with and actuated by the lever W by means of the connecting-bar X', one end of which is pivoted to the lever W and its other end to the lever W'. The action of the levers W and W', in connection with the cam $w'$, is such as to give the bars T' and T''' their required motions, already described, and to keep the foot $w'$ and head $v$ pressed together during the operation of barbing or wrapping the barb-wire $a''$ around the fence-wire $a$. The form or outline of this cam $w'$ is more fully shown in Fig. 10.

Y is a curved guide-piece attached to the projection V on the bar T''', for the purpose of guiding or slightly inclining the projecting end of the barb-wire $a''$ toward the notched hook $o$, thereby insuring that the barb-wire $a''$ be caught in the jaws of the notch $o'$. It is fixed by means of a screw to the projection V on the bar T.

Y is a skeleton guide-roll, under which the fence-wires $a$ and $a'$ pass on leaving the feed-wheel H. In the machine it occupies a horizontal position, but in the drawings it has been represented as slightly inclined, for the purpose of better showing the same. Its sheave Y'' is attached by means of a bolt or screw to the leg A'.

Having now described my entire machine, its operation is briefly as follows: The fence-wires $a$ $a'$ having been passed through the machine in the manner shown, and being in position for fixing a barb upon the wire $a$, and the barbed wire $a''$ fed forward in the manner described, its end projecting immediately beneath the fence-wire $a$, by motion of the bars T' and T''' the fence-wire $a$ is then clamped between the grooved foot $w'$ and the head of the pin V', and at the same time the barbing-hook $o$ on the shaft O is moved into position, catches the projecting end of the barb-wire $a''$, and wraps the same around the fence-wire $a$, as described. By motion of the bars T' and T''' the formed barb is immediately severed from the barb-wire $a''$ on a diagonal cut, thereby pointing the same, and at the same time the barbing-hook $o$ is withdrawn and cleared from the completed barb, and the fence-wires $a$ and $a'$ are again fed forward into position for the next barb, and pass thence to the devices or machine for twisting and spooling the wires.

I disclaim as my separate invention the device for wrapping the barb around the fence-wire, consisting of the notched barbing-hook $o$ and hollow shaft O and the mechanism described for actuating the same, together with the arm $u'$ and pin V' for holding the fence-wire $a$ in steady position during the process of barbing, and also the guide Y, as these parts are the joint invention of Edwin A. Beers and myself, for which we intend making joint application for a patent.

What I claim as my invention is—

1. In a wire-barbing machine, the combination, with movable bars T' and T''', provided with cutters $t'$ and $t'$, of mechanism for operating the same, substantially as and for the purpose described.

2. The combination, with movable bars T' and T''', of levers W and W', connecting-bar X', and cam $w$, substantially as described.

3. The combination, with movable bars T' and T''', of cutters $t'$ $t'$, arm $u$, pin V, levers W and W', connecting bar X', and cam $w$, substantially as described.

4. The movable bar T', provided with a long notch or detent, U, in combination with movable bar T''', either with or without a similar notch, U, and mechanism whereby one of the bars, T', is raised and the other bar, T''', is lowered, whereby both the cutters $t'$ $t'$ are moved out of the way of the end of the barb-wire when the same is being wrapped around the fence-wire, substantially as described.

5. The polygon-shaped feed-wheel H, provided with a series of notched lugs, $h$, substantially as and for the purpose described.

6. The combination, with feed-wheel H, of guide-rolls F F, provided with a roughened groove and flat guide-piece $m$.

7. The combination, with feed-wheel H, of mechanism for alternately turning and locking the same, consisting of wheel $i$, provided with a series of pins, $i'$, and wheel J, provided with cams $j$ and grooves $j'$, substantially as described.

8. The combination, with feed-rolls K K, of wheel $i'''$, provided with a series of pins, $i''''$, wheel J, provided with cam $j'''$ and groove $j''''$, and the intermediate gearing connecting said mechanism with the feed-rolls, substantially as described.

9. The combination, with feed-rolls K K, provided with a roughened guide-groove, of guide or eye *n*, substantially as and for the purpose set forth.

10. In a barb-fence machine, the combination of the twisting mechanism with movable barbs T' and T'', carrying cutters *t'* and *t'*, one or both the said bars provided with a long notch or detent, U, substantially as and for the purpose set forth.

11. The combination, with shaft C, of pinion 33, crank P, cam *r* on cylinder R, cam *w* on wheel *w'*, and cam-wheels J and J', whereby each of the separate devices of the machine is actuated independently of each other and directly from the shaft C, substantially as and for the purpose set forth.

THOMAS W. EATON.

Witnesses:
  CLARENCE A. KNIGHT,
  WILLIAM PRESCOTT.